US009189884B2

(12) United States Patent
Gharpure et al.

(10) Patent No.: US 9,189,884 B2
(45) Date of Patent: Nov. 17, 2015

(54) USING VIDEO TO ENCODE ASSETS FOR SWIVEL/360-DEGREE SPINNERS

(71) Applicants: Chaitanya Gharpure, Santa Clara, CA (US); James J. Kuffner, Jr., Mountain View, CA (US)

(72) Inventors: Chaitanya Gharpure, Santa Clara, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 405 days.

(21) Appl. No.: 13/675,849

(22) Filed: Nov. 13, 2012

(65) Prior Publication Data

US 2014/0132594 A1   May 15, 2014

(51) Int. Cl.
*G06T 15/00* (2011.01)
*G06T 15/20* (2011.01)
*H04N 13/00* (2006.01)
*H04N 13/02* (2006.01)

(52) U.S. Cl.
CPC .......... *G06T 15/205* (2013.01); *H04N 13/0011* (2013.01); *H04N 13/0278* (2013.01)

(58) Field of Classification Search
None
See application file for complete search history.

(56) References Cited

U.S. PATENT DOCUMENTS

| 2001/0014172 | A1* | 8/2001 | Baba et al. | 382/154 |
| 2002/0105513 | A1 | 8/2002 | Chen | |
| 2007/0120843 | A1 | 5/2007 | Park et al. | |
| 2009/0184936 | A1* | 7/2009 | Algreatly | 345/173 |
| 2012/0317236 | A1* | 12/2012 | Abdo et al. | 709/219 |

FOREIGN PATENT DOCUMENTS

WO    0214982 A2   2/2002

OTHER PUBLICATIONS

Autodesk 123D Catch, Catch and carry, Turn ordinary photos into extraordinary 3D models, www.123dapp.com/catch, retrieved Jan. 2013.

* cited by examiner

*Primary Examiner* — James A Thompson
*Assistant Examiner* — Xilin Guo
(74) *Attorney, Agent, or Firm* — McDonnell Boehnen Hulbert & Berghoff LLP

(57) ABSTRACT

A method and system for video encoding assets for swivel/360-degree spinners is disclosed. Still images of a 3D object from different perspectives about the 3D object may be stacked and then video encoded to generate video frames of the object from the different perspectives. The video-encoded assets may be stored on a server or other network-connected device, and later retrieved by a connected client device for display processing by a swivel/360-degree spinner on the client device. The swivel/360-degree spinner may utilize native video processing capabilities of the client device and/or of a browser running on the client device to display video motion of the object moving through different angular orientations in response to movement of an interactive cursor.

20 Claims, 11 Drawing Sheets

USING VIDEO TO ENCODE ASSETS FOR SWIVEL/360-DEGREE SPINNERS

BACKGROUND

Unless otherwise indicated herein, the materials described in this section are not prior art to the claims in this application and are not admitted to be prior art by inclusion in this section.

Various technologies can be utilized to provide users with electronic access to data and services in communication networks, as well as to support communication between users. For example, devices such as computers, telephones, and personal digital assistants (PDAs) can be used to exchange information over communication networks including the Internet. Communication networks may in turn provide communication paths and links to servers, which can host applications, content, and services that may be accessed or utilized by users via communication devices. The content can include text, video data, audio data and/or other types of data.

BRIEF SUMMARY

In one aspect, an example embodiment presented herein provides a method comprising: generating a respective still image of a three-dimensional (3D) object from each of a multiplicity of perspectives corresponding to different 3D angular orientations about the 3D object, each respective still image comprising respective data for display on a display device, and each being one of a plurality of still images of the 3D object; determining an ordering of the multiplicity of perspectives corresponding to minimally differential changes in 3D angular orientation from one of the different 3D angular orientations to the next; constructing a sequence of still images by ordering successive still images of the plurality in correspondence to the determined ordering of the multiplicity of perspectives; and encoding the sequence of still images with a video encoder to generate a compressed video-format rendering of the sequence of still images, wherein the compressed video-format rendering of the sequence of still images is smaller in total data volume than a sum of all of the still images of the sequence.

In another aspect, an example embodiment presented herein provides a method comprising: responsive to a request transmitted from a computer device to a server communicatively connected to the computer device, receiving by the computer device a video file comprising video frames of a compressed video-format rendering of a sequence of still images of a three-dimensional (3D) object viewed from each of a multiplicity of perspectives corresponding to different 3D angular orientations about the 3D object; displaying by the computer device an image of the 3D object in a display window on a display device of the computer device; and responsive to an interactive cursor of a user interface of the computer device moving on one or more trajectories in the display window while virtually attached to the 3D object, video processing by the computer device a subset of the video frames corresponding to a subset of the multiplicity of perspectives traversed by the one or more trajectories, in order to display animated 3D angular movement of the 3D object about at least one axis that passes through the 3D object.

In still another aspect, an example embodiment herein provides a system comprising: one or more processors; memory; and machine-readable instructions stored in the memory, that upon execution by the one or more processors cause the system to carry out operations comprising: generating a respective still image of a three-dimensional (3D) object from each of a multiplicity of perspectives corresponding to different 3D angular orientations about the 3D object, each respective still image comprising respective data for display on a display device, and each being one of a plurality of still images of the 3D object, determining an ordering of the multiplicity of perspectives corresponding to minimally differential changes in 3D angular orientation from one of the different 3D angular orientations to the next, constructing a sequence of still images by ordering successive still images of the plurality in correspondence to the determined ordering of the multiplicity of perspectives, and encoding the sequence of still images with a video encoder to generate a compressed video-format rendering of the sequence of still images, wherein the compressed video-format rendering of the sequence of still images is smaller in total data volume than a sum of all of the still images of the sequence.

In yet another aspect, an example embodiment presented herein provides a system comprising: one or more processors, including one or more video processors; memory; and machine-readable instructions stored in the memory, that upon execution by the one or more processors cause the system to carry out operations comprising: receiving a video file comprising video frames of a compressed video-format rendering of a sequence of still images of a three-dimensional (3D) object viewed from each of a multiplicity of perspectives corresponding to different 3D angular orientations about the 3D object, displaying an image of the 3D object in a display window on the display device, and responsive to an interactive cursor of a user interface of the computer device moving on one or more trajectories in the display window while virtually attached to the 3D object, video processing with the one or more video processors a subset of the video frames corresponding to a subset of the multiplicity of perspectives traversed by the one or more trajectories, in order to display on the display device animated 3D angular movement of the 3D object about at least one axis that passes through the 3D object.

In still one more aspect, an example embodiment presented herein provides an article of manufacture including a computer-readable storage medium, having stored thereon program instructions that, upon execution by one or more processors of a system, cause the system to perform operations comprising: generating a respective still image of a three-dimensional (3D) object from each of a multiplicity of perspectives corresponding to different 3D angular orientations about an the 3D object, each respective still image comprising respective data for display on a display device, and each being one of a plurality of still images of the 3D object; determining an ordering of the multiplicity of perspectives corresponding to minimally differential changes in 3D angular orientation from one of the different 3D angular orientations to the next; constructing a sequence of still images by ordering successive still images of the plurality in correspondence to the determined ordering of the multiplicity of perspectives; and encoding the sequence of still images with a video encoder to generate a compressed video-format rendering of the sequence of still images, wherein the compressed video-format rendering of the sequence of still images is smaller in total data volume than a sum of all of the still images of the sequence.

In yet one more aspect, an example embodiment presented herein provides an article of manufacture including a computer-readable storage medium, having stored thereon program instructions that, upon execution by one or more processors of a system, cause the system to perform operations comprising: responsive to a request transmitted from the system to a server communicatively connected to the system, receiving by the system a video file comprising video frames of a compressed video-format rendering of a sequence of still images of a three-dimensional (3D) object viewed from each of a multiplicity of perspectives corresponding to different 3D angular orientations about the 3D object; displaying an image of the 3D object in a display window on a display device of the system; and responsive to an interactive cursor of a user interface of the computer device moving on one or more trajectories in the display window while virtually attached to the 3D object, video processing by the system a subset of the video frames corresponding to a subset of the multiplicity of perspectives traversed by the one or more trajectories, in order to display animated 3D angular movement of the 3D object about at least one axis that passes through the 3D object.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
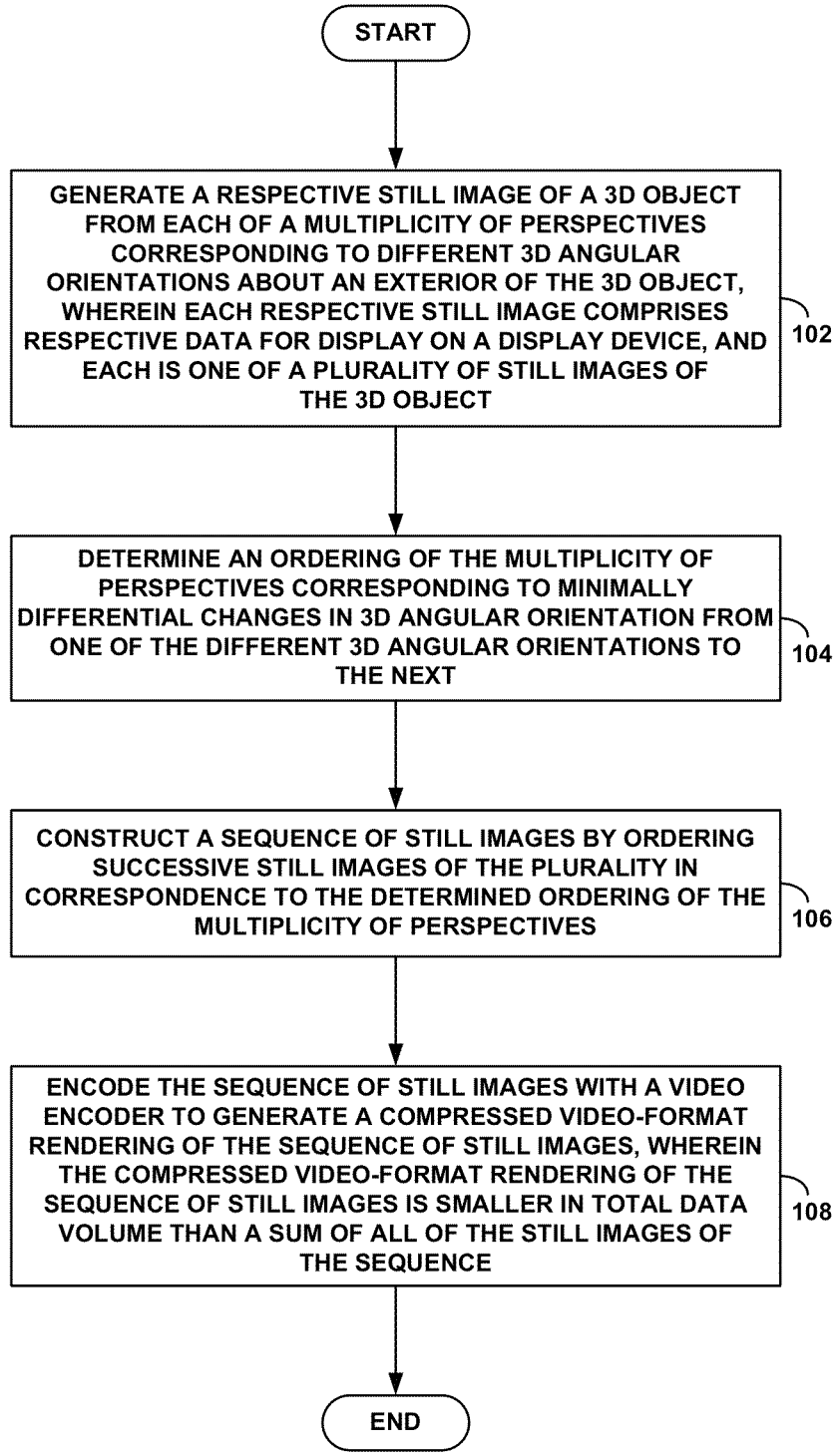
FIG. 1 is a flowchart illustrating an example method for video encoding of assets for a swivel/360-degree spinner, in accordance with an example embodiment.

A swivel/360-degree spinner is an interactive, graphical user interface (or a tool thereof) that functions to display a three-dimensional (3D) object on a display device, and in particular, to interactively manipulate the display of the 3D object as the 3D object is made to appear to be continuously (or nearly continuously) rotated through a variety of angular orientations. A swivel/360-degree spinner may be implemented in a computer device, such as desktop, laptop, smart phone, smart tablet, or other client device, and as such, may provide the interactive function to a user of the computer device.

In practice, the interactive capability of a swivel/360-degree spinner may be made available by way of an interactive cursor in a display of a display device of the computer device. For example, the interactive cursor could be controlled by a mouse or other type of physical device interface. In certain embodiments of such an interactive cursor in general, the cursor associated with a swivel/360-degree spinner may include a capability to virtually "grab" a 3D object in the display. The swivel/360-degree spinner could then cause the 3D object to appear to rotate in the virtual 3D space of the display in an animated fashion in response to the cursor virtually "dragging" the 3D object through various angular orientations with respect to a viewing perspective of the display. Other user interface paradigms may provide similar functionality, such as use of left-right-up-down arrows of a keyboard, motion of a joystick or similar controller, relative motion of a hand-held device (such as motion of a smartphone on which the image is being displayed), and so on.

Geometrically, apparent rotational motion of a 3D object as viewed from a particular perspective can be equivalent to viewing the 3D object from a perspective that follows a path, such as an orbit, around the 3D object in some fashion. For example, an orbit could lie in a plane that passes through or near the object. In addition, there could be multiple orbits, each on a different plane. Different planes could be parallel to each other, corresponding to different latitudes with respect to the 3D object. Additionally or alternatively, different planes could correspond to different meridian planes with respect to the 3D object. These are just two examples of different orbital orientations that can result in different perspectives from which the 3D object may be viewed. Furthermore, a path around the 3D object could be only part of an orbit (e.g., an arc). In addition, the path need not necessarily correspond to a regular geometric figure (e.g., a conic section), but could more generally be an arbitrary curve having an approximate axis of rotation that passes through or near the 3D object.

By generating images of the 3D object from multiple perspectives along one or more paths or orbits around the 3D object, and then displaying the generated images in an animated sequence, the 3D object can be made to appear to rotate in correspondence with the change in perspective from one image to the next. Using images from multiple paths or orbits, for example, the 3D object can be made to appear to rotate through a variety of angular orientations—possibly arbitrary and/or about multiple different axes that pass through or near the 3D object—corresponding to one or another sequential ordering of the images.

Taking a collection or set of such images from different perspectives, together with associated information labeling or identifying the orientation of the perspectives (e.g., angles with respect to the 3D object), as input, a swivel/360-degree spinner can provide interactive control of the apparent angular motion of the 3D object. More particularly, one or another of the trajectories of the cursor on the display may be translated in one or another corresponding path orbit or path around the 3D object, which may in turn be used to identify and/or select corresponding images to display in animated fashion.

A conventional approach for creating images from different perspectives around a 3D object is to generate a separate "still" image from each perspective. In this approach, each still image is complete by itself, and can be displayed in a display device independently of any of the other images. Note that the still images of the 3D object from the different perspective could be generated photographically (e.g., from digital photographs), and/or using 3D graphics rendering tool (e.g., such as a computer aided display tool).

For a conventional swivel/360-degree spinner processing using a conventional collection or set still images and ancillary information (e.g., angular orientations), input files or data streams having sizes of several (e.g. 3-10) megabytes, for example, may not be uncommon. At the same time, executable programs that render angular animation based on the images can involve customized algorithms that may be slow and/or not conveniently amenable to optimization. In some applications of a swivel/360-degree spinner, the large data sizes and/or a need for specialized algorithms can pose certain challenges.

For example, in the context of a browser program, the collection of data used to generate a display page, such as text, images, embedded computer code, etc., is customarily referred to as "assets." In the case of a conventional swivel/360-degree spinner, conventional assets may include one or more sets of images and ancillary information identifying angles, etc. In practice, assets may be stored on a server in a network, for example, and may be retrieved and sent to a client device in response to a request to activate a swivel/360-degree spinner. As such, network transport and associated latency may become a factor. The larger the assets, the potentially larger the latency. For some applications, such as product advertising, latency can have a negative impact on effectiveness. Even when latency is less of an potential drawback, asset size may still be an issue if storage space (or lack thereof) is a concern.

One approach that has been adopted to mitigate the possible effects of latency is to reduce asset size by including fewer and/or smaller images. However, fewer images can result in choppy animation of angular motions, while smaller images can result in lower quality (e.g., lower image resolution). Thus, while latency associated with large asset size may be reduced to some extent, the quality of the rendering produced by a conventional swivel/360-degree spinner may suffer. Taking advertising again as an example application, a tradeoff between latency and quality may not yield a desirable or acceptable outcome. There may be other applications of a swivel/360-degree spinner for which such a tradeoff is also problematic. Accordingly, it would be desirable to devise an approach to generating assets for swivel/360-degree spinners, and for processing and displaying those assets, that can reduce latency associated with transmitting assets in a network, while at the same time supporting high-quality rendering of 3D motion of 3D objects by swivel/360-degree spinners.

In accordance with example embodiments described herein, assets for swivel/360-degree spinners may be video-encoded and compressed in order to both reduce the size of the assets, and to render them in a form suitable for processing by one or more standard video display techniques typically available on many computer client devices. More particularly, a sequence of still images of a 3D object viewed from multiple perspectives along a path or orbit or a portion of an orbit around the 3D object may be encoded with a video encoder to generate a sequence of video frames of the multiple perspectives. Since adjacent frames of video data can be represented largely as just changes from one frame to the next, video frames of the 3D object from incrementally different perspectives can be captured in a smaller amount of data than the sum of the individual still images. For example, size reductions of a factor of four or more can be achieved, and without sacrificing image resolution of number of images across a path of perspectives.

At the same time, many computer client devices may include native support for processing video data according to standard video formats, such as h.264, webm, and avi, for example. In addition, many standard web browsers include support for processing these types of standard video formats as well. Thus, a swivel/360-degree spinner may be implemented using standard video hardware, firmware, and software available on many client devices. Standard video techniques not only enable smooth video display of a 3D object from successive perspectives along a path or orbit around the 3D object, but they may also enable pixel interpolations between locations of perspectives at which images may not exist in the image data. In addition, by video processing images taken from paths in planes with different angular orientation with respect to the 3D object, the swivel/360-degree spinner can support switching between different paths of perspectives.

In accordance with example embodiments, a video rendering of different views of a 3D object from different, successive perspectives around the 3D object may be made to display the 3D object smoothly rotating about various different axes, as viewed from a particular fixed perspective. It should be understood that the term "orbit" as used herein is not necessarily intended to describe an orbit in strict correspondence conic sections, for example, although such orbits are not excluded from consideration. Rather, the term is meant to convey a curved path around the 3D object. The path may be closed (e.g., a circle), or open (e.g., an arc of a circle). Other forms of paths are possible as well.

By video encoding assets for swivel/360-degree spinners, asset files can be made small enough to allow network transmission between a server device (for example) and a client device on which a swivel/360-degree spinner is implemented without incurring significant latency. Consequently, applications that utilize swivel/360-degree spinners may execute more effectively and efficiently than those using the conventional approach. Additionally or alternatively, the amount of storage space (e.g., memory) allocated on a client device for assets may also be reduced in comparison with conventional assets. Moreover, since there is no sacrifice of image resolution or of the number of frames along a perspective path, high-quality renderings of 3D object rotation are made possible by the video-encoding approach.

In example embodiments, video encoding of assets for swivel/360-degree spinners can be implemented in a system that includes one or more processors, one or more forms of memory, one or more input devices/interfaces, one or more output devices/interfaces, and machine-readable instructions that when executed by the one or more processors cause the system to carry out the various functions and tasks described herein. In particular, the functions and tasks may form a basis for a method for both video encoding of assets for swivel/360-degree spinners, and implementing a swivel/360-degree spinner that uses video encoded assets. Both aspects of an example method are respectively illustrated in FIGS. 1 and 2, as discussed below.

FIG. 1 is a flowchart illustrating an example method for video encoding of assets for a swivel/360-degree spinner, in accordance with an example embodiment. As customarily used, and as used herein, "assets" may be considered to be a collection of data, such as a file, a portion of a file, or a structure, for example, that include or contain information used to render a page or a portion of a page in browser program running on a computer device. Because assets (as used herein) typically may include images of a three-dimensional (3D) object, the discussion of FIG. 2 refers primarily to images. It will be appreciated that there could be other data or information associated with an image of a 3D object, and that assets may include such information as well.

At step 102 the system generates a respective still image of a 3D object from each of a multiplicity of perspectives corresponding to different 3D angular orientations about the 3D object. Each respective still image may correspond to respective data for display on a display device. For example, each image could be a pixel file (or file portion) suitable for display on display device (e.g., LCD display). Each image may be considered to be one of a plurality of still images of the 3D object, and each is a complete image that can be displayed independently of other images of the plurality. Additional information about each image could include data for specifying the perspective, such as angular orientation of the perspective with respect to the 3D object, distance from the 3D object, etc.

At step 104 an ordering of the multiplicity of perspectives is determined that corresponds to minimally differential changes in 3D angular orientation from one of the different 3D angular orientations to the next. More particularly, each perspective may correspond to a different angular orientation of the perspective with respect to the 3D object. As such, there is a differential change in 3D angular orientation between any two perspectives. The ordering of step 104 is a sequence of perspectives that corresponds to minimum differential changes between adjacent perspectives in the sequence. By way of example, the ordering could correspond to successive positions along a path or orbit or section of an orbit.

At step 106 a sequence of still images is constructed by ordering successive still images of the plurality in correspondence to the determined ordering of the multiplicity of perspectives. That is, the order from one still image to the next in the sequence of still images is the same as the order from one perspective to the next in the ordering of the multiplicity determined at step 104.

Finally, at step 108 the sequence of still images is encoded with a video encoder to generate a compressed video-format rendering of the sequence of still images. In doing so, the compressed video-format rendering of the sequence of still images is made to be smaller in total data volume than a sum of all of the still images of the sequence. This compression can be achieved because the ordering of still images in the sequence may be such that adjacent images of the 3D object from one perspective to the next may be relatively similar. Accordingly, a video encoder may encode successive images as successive video frames, in which each successive frame may be generated by encoding just (or largely just) the changes from on frame to the next.

In accordance with example embodiments, generating the respective still image of the 3D object from each of the multiplicity of perspectives could correspond to generating a still image of the 3D object viewed from each of the multiplicity of perspectives exterior to the 3D object. More particularly, the multiplicity of perspectives of the 3D object are described herein as providing views of the 3D object from outside of the 3D object. However, it is contemplated that the various concepts and principles of the example embodiments discussed herein can apply as well to perspectives that may be obtained from inside of a 3D object, for example looking outward. There is no loss in generality by considering primarily exterior perspectives of a 3D object.

In accordance with example embodiments, generating the respective still image of the 3D object from each of the multiplicity of perspectives could correspond to generating a digital photograph of the 3D object viewed from each of the multiplicity of perspectives. For example, a camera (or other still image capture device) could be moved to each perspective location to generate the images one at a time; or the camera could be place at a fixed location and the 3D object rotated through different orientations that correspond to the different perspectives. Additionally or alternatively, generating the respective still image of the 3D object from each of the multiplicity of perspectives could correspond to generating a 3D visual rendering of the 3D object viewed from each of the multiplicity of perspectives with a computer-based 3D graphics tool.

In accordance with example embodiments, generating the respective still image of the 3D object from each of the multiplicity of perspectives could correspond to generating each respective still image from a different position along a respective curved path in at least one plane perpendicular to an axis that passes through the 3D object. For example still images could be generated from different positions along a respective curved path in each of at least two different planes perpendicular to a common axis that passes through the 3D object. An example of curved paths on two such planes is curves of latitude in two latitudinal planes having a common axis. Additionally or alternatively, still images could be generated from different positions along a respective curved path in each of at least two different planes, each plane perpendicular to a different axis that passes through (or near) the 3D object. An example of curves paths on two such planes are curves of longitude in two longitudinal planes (i.e., meridian planes) whose common intersection is an axis that passes through (or near) the 3D object.

As a further possibility, multiple planes could include some of each type of planes. For example, multiple planes could include two or more parallel planes and one or more planes that intersect the parallel planes. As still another example, multiple planes could include two or more meridian planes and one or more latitudinal planes. Other configurations are possible as well.

In accordance with example embodiments, determining the ordering of the multiplicity of perspectives could correspond to identifying from among the multiplicity a subset of perspectives that are each located within a threshold distance of a different sequential point on a respective curved path in at least one plane perpendicular to an axis that passes through the 3D object. For example, there could be a respective curved path in each of at least two different planes perpendicular to a common axis that passes through the 3D object. Again, an example of curved paths on two such planes is curves of latitude in two latitudinal planes having a common axis. Additionally or alternatively, there could be a respective curved path in each of at least two different planes, each perpendicular to a different axis that passes through the 3D object. Again, an example of curves paths on two such planes are curves of longitude in two longitudinal planes (i.e., meridian planes) whose common intersection is an axis that passes through the 3D object. Once more, other configurations of planar curves are possible as well.

In accordance with example embodiments, the determined ordering of the multiplicity of perspectives could be an order from a first perspective to a last perspective. Then, constructing the sequence of still images by ordering the successive still images of the plurality in correspondence to the determined ordering of the multiplicity of perspectives could correspond to constructing a sequence of still images by ordering the successive still images of the plurality in correspondence to an ordering from the first perspective to the last perspective.

In accordance with example embodiments, encoding the sequence of still images with the video encoder to generate the compressed video-format rendering of the sequence of still images could correspond to generating a sequence of video frames corresponding to viewing the 3D object from a particular perspective, as the particular perspective moves in at least one direction along a respective curved path in at least one plane perpendicular to an axis that passes through the 3D object. For example, there could be a respective curved path in each of at least two different planes perpendicular to a common axis that passes through the 3D object. Again, an example of curves paths on two such planes are curves of latitude in two latitudinal planes having a common axis. Additionally or alternatively, there could be a respective curved path in each of at least two different planes, each perpendicular to a different axis that passes through the 3D object. Again, an example of curves paths on two such planes are curves of longitude in two longitudinal planes (i.e., planes of meridian) having whose common intersection is an axis that passes through the 3D object.

In further accordance with example embodiments, generating the sequence of video frames corresponding to viewing the 3D object from the particular perspective as the particular perspective moves in the at least one direction along the respective curved path could correspond to generating a subsequence of video frames corresponding to viewing the 3D object from the particular perspective as the particular perspective moves in the one direction along the respective curved path.

In further accordance with example embodiments, generating the sequence of video frames corresponding to viewing the 3D object from the particular perspective as the particular perspective moves in the at least one direction along the respective curved path could correspond to generating a sequence of video frames corresponding to viewing the 3D object from the particular perspective as the 3D object is rotated about the axis. That is, while the various perspectives may correspond to different location about the 3D object (or virtual locations for images generated with a graphics tool, for example), the motion represented the video frames can be made to appear as spatial rotation of the 3D object as viewed from a particular fixed perspective.

In accordance with example embodiments, the video encoder could be configured to operate according to one or more video protocols, including, for example, h.264, webm, and avi. It will be appreciated that the video encoder could be configured to operated according to other video protocols as well.

Figure 2:
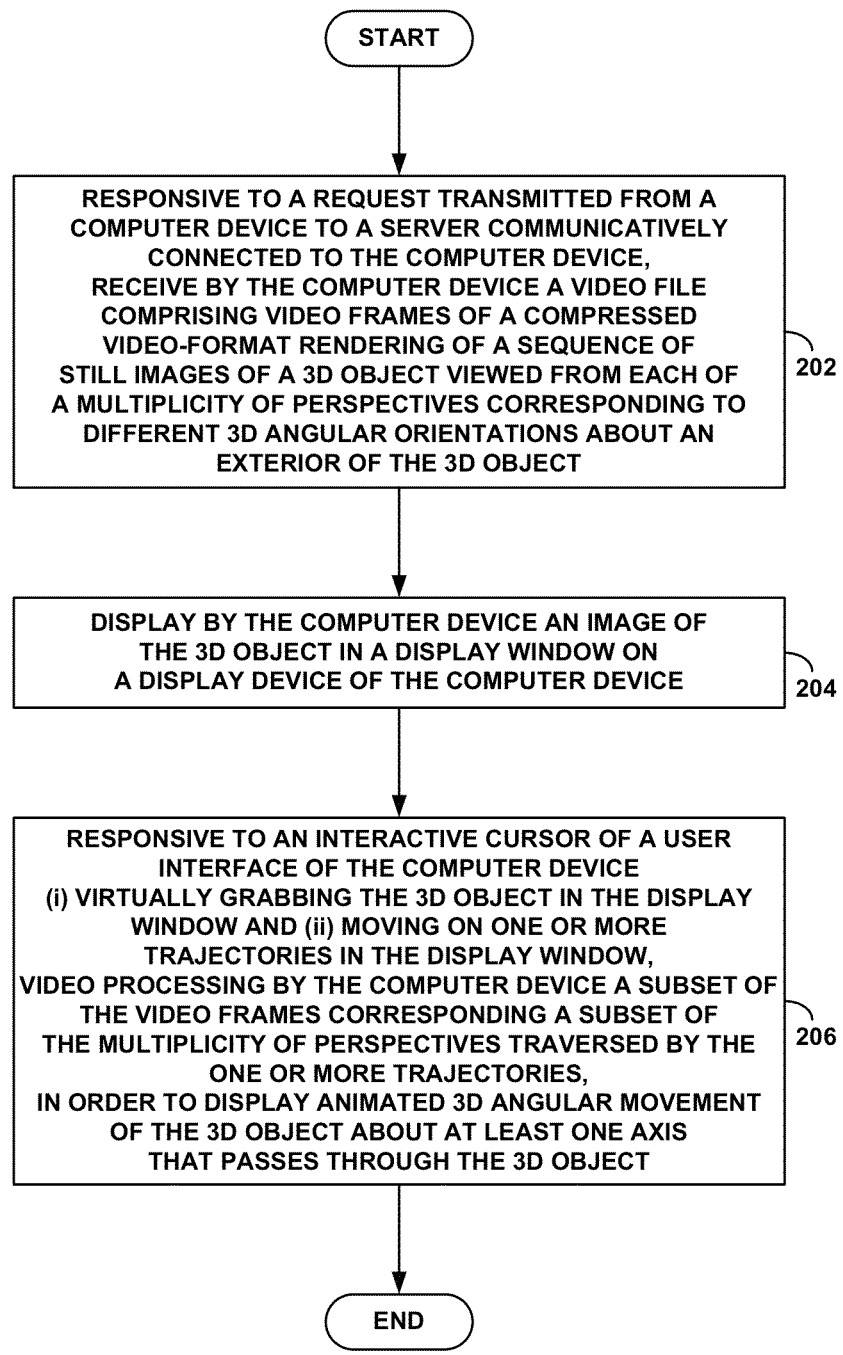
FIG. 2 is a flowchart illustrating an example method for displaying video encoded assets with a swivel/360-degree video spinner, in accordance with an example embodiment.

FIG. 2 is a flowchart illustrating an example method for displaying video encoded assets with a swivel/360-degree spinner, in accordance with an example embodiment. The swivel/360-degree spinner could be implemented as part of a graphical user interface on a computer device, such as a desktop or laptop computer, smart phone, or interactive display tablet, for example. As such, the functions of the swivel/360-degree spinner could be considered more generally as being carried out by a computer device having a display device user interface that includes an interactive cursor, for example. The user interface could include the swivel/360-degree spinner, and could include a function whereby the cursor can virtually "grab" one or more graphical objects in the display of the display device, and then manipulate the virtually grabbed objects. For example, a virtually grabbed object could be dragged within a display region on the display. In the context of such an interactive user interface, the swivel/360-degree spinner can provide a capability of virtually rotating a grabbed 3D object through various angular orientations. In the discussion below of the FIG. 2, the functions of the spinner are described as being carried out by a computer device. Other techniques for controlling the display orientation of the graphical object(s) are contemplated and within the scope of the present disclosure.

At step 202, a video file that includes video frames of a compressed video-format rendering of a sequence of still images of a three-dimensional (3D) object viewed from each of a multiplicity of perspectives corresponding to different 3D angular orientations about the 3D object is received in response to a request transmitted from a computer device to a server communicatively connected to the computer device. The file could correspond to the encoded video created at step 108 discussed in FIG. 1, for example, and could be stored on the server. The request could correspond to a selection (e.g., "clicking") of a link displayed in a page in a browser, for example. An example of such a request is a HTTP request; other types of requests are possible as well.

At step 204, the computer device could display an image of the 3D object in a display window on a display device of the computer device.

Finally, at step 206, an interactive cursor of a user interface of the computer device moves on one or more trajectories in the display window while it is virtually attached to the 3D object. In response to cursor movement, angular motion of 3D object could be animated by video processing by the computer device a subset of the video frames corresponding to a subset of the multiplicity of perspectives traversed by the one or more trajectories. In particular, the angular motion of 3D object could be animated to make the 3D object appear to rotate about at least one axis that passes through the 3D object.

In accordance with example embodiments, the interactive cursor could move on the one or more trajectories in the display window while it is virtually attached to the 3D object by first virtually grabbing the 3D object, and the moving on the one or more trajectories in the display window. By way of example, the 3D object could be virtually grabbed in response to a selection by physical device interface, such a "click" of a mouse. Other operations are possible as well.

In accordance with example embodiments, the multiplicity of perspectives corresponding to different 3D angular orientations about the 3D object could correspond to perspectives from different positions along a respective curved path exterior to the 3D object and in at least one plane perpendicular to an axis that passes through the 3D object. For example, the different positions could located along a respective curved path in each of at least two different planes perpendicular to a common axis that passes through the 3D object. Additionally or alternatively, the different positions could be located along a respective curved path exterior to the 3D object and in each of at least two different planes, each perpendicular to a different axis that passes through the 3D object.

As with the discussion of FIG. 1 above, it is contemplated that the various concepts and principles of the example embodiments discussed herein in connection with viewing a 3D object with a swivel/360-degree spinner can apply as well to perspectives that may be obtained from inside of a 3D object, for example looking outward. Again, there is no loss in generality by considering primarily exterior perspectives of a 3D object.

In accordance with example embodiments, video processing by the computer device of the subset of the video frames corresponding to the subset of the multiplicity of perspectives traversed by the one or more trajectories could correspond to displaying video motion of the 3D object rotating around the at least one axis, as viewed from a particular perspective. For example, two or more different axes could each pass through the 3D object, and moving on the one or more trajectories in the display window could correspond to switching between at least two of the two or more axes. Then, displaying video motion of the 3D object rotating around the at least one axis, as viewed from a particular perspective could correspond to displaying respective segments of video motion of the 3D object rotating around each of the at least two of the two or more axes in correspondence to switching between at least two of the two or more axes.

In further accordance with example embodiments, there could be two trajectories: a clockwise trajectory and a counterclockwise trajectory (corresponding to a reverse of the clockwise trajectory). Then, displaying video motion of the 3D object rotating around the at least one axis, as viewed from a particular perspective could correspond to displaying rotational motion of the 3D object in a clockwise rotational direction around the at least one axis in response to motion on the clockwise trajectory, and displaying rotational motion of the 3D object in a counterclockwise rotational direction around the at least one axis in response to motion on the counterclockwise trajectory.

In further accordance with example embodiments, video processing by the computer device of a subset of the video frames corresponding to a subset of the multiplicity of perspectives traversed by the one or more trajectories could correspond to interpolating video data. More specifically, video data from two or more nearby frames could be used to interpolate video data for perspectives not strictly included in the subset. By way of example, video frames including perspectives along respective paths in each of two different planes could be used to interpolate video data corresponding to perspectives along an interpolated path in an interpolated plane. The perspectives along such a path could be considered interpolated perspectives from different positions along a respective curved path in at least one interpolated plane perpendicular to an interpolated axis that passes through the 3D object. Video motion of the 3D object rotating around the at least one interpolated axis, as viewed from a particular perspective, could be generated from the interpolated video data.

In accordance with example embodiments, displaying video motion of the 3D object rotating around the at least one axis, as viewed from the particular perspective could correspond to displaying the video motion in a browser program of the computer device. The browser program could include a video application programming interface (API). By way of example, the API could be HTML5.

It will be appreciated that the steps shown in FIGS. 1 and 2 are meant to illustrate the respective methods in accordance with example embodiments. As such, various steps could be altered or modified, the ordering of certain steps could be changed, and additional steps could be added, while still achieving the overall desired operation.

Methods in accordance with an example embodiment, such as the on described above, devices, could be implemented using so-called "thin clients" and "cloud-based" server devices, as well as other types of client and server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

Figure 3:
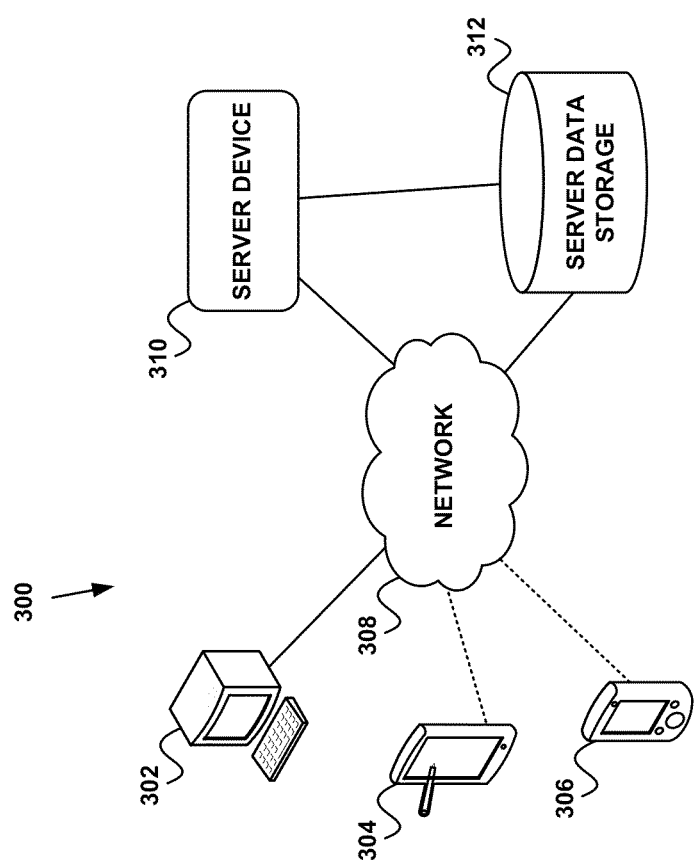
FIG. 3 is a block diagram of an example network and computing architecture, in accordance with an example embodiment.

FIG. 3 is a simplified block diagram of a communication system 300, in which various embodiments described herein can be employed. Communication system 300 includes client devices 302, 304, and 306, which represent a desktop personal computer (PC), a tablet computer, and a mobile phone, respectively. Client devices could also include wearable computing devices, such as head-mounted displays and/or augmented reality displays, for example. Each of these client devices may be able to communicate with other devices (including with each other) via a network 308 through the use of wireline connections (designated by solid lines) and/or wireless connections (designated by dashed lines).

Network 208 may be, for example, the Internet, or some other form of public or private Internet Protocol (IP) network. Thus, client devices 302, 304, and 306 may communicate using packet-switching technologies. Nonetheless, network 308 may also incorporate at least some circuit-switching technologies, and client devices 302, 304, and 306 may communicate via circuit switching alternatively or in addition to packet switching.

A server device 310 may also communicate via network 308. In particular, server device 310 may communicate with client devices 302, 304, and 306 according to one or more network protocols and/or application-level protocols to facilitate the use of network-based or cloud-based computing on these client devices. Server device 310 may include integrated data storage (e.g., memory, disk drives, etc.) and may also be able to access a separate server data storage 312. Communication between server device 310 and server data storage 312 may be direct, via network 308, or both direct and via network 308 as illustrated in FIG. 3. Server data storage 312 may store application data that is used to facilitate the operations of applications performed by client devices 302, 304, and 306 and server device 310.

Although only three client devices, one server device, and one server data storage are shown in FIG. 3, communication system 300 may include any number of each of these components. For instance, communication system 300 may comprise millions of client devices, thousands of server devices and/or thousands of server data storages. Furthermore, client devices may take on forms other than those in FIG. 3.

Figure 4A:
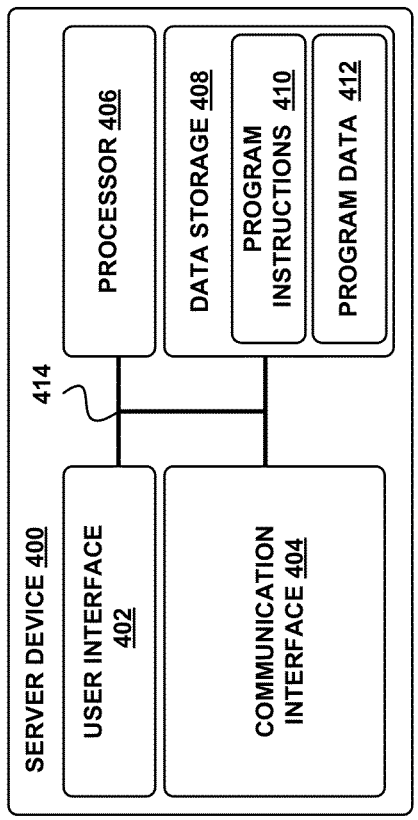
FIG. 4A is a block diagram of a server device, in accordance with an example embodiment.

FIG. 4A is a block diagram of a server device in accordance with an example embodiment. In particular, server device 400 shown in FIG. 4A can be configured to perform one or more functions of server device 310 and/or server data storage 312. Server device 400 may include a user interface 402, a communication interface 404, processor 406, and data storage 408, all of which may be linked together via a system bus, network, or other connection mechanism 414.

User interface 402 may comprise user input devices such as a keyboard, a keypad, a touch screen, a computer mouse, a track ball, a joystick, and/or other similar devices, now known or later developed. User interface 402 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 402 may be configured to generate audible output(s), via a speaker, speaker jack, audio output port, audio output device, earphones, and/or other similar devices, now known or later developed. In some embodiments, user interface 402 may include software, circuitry, or another form of logic that can transmit data to and/or receive data from external user input/output devices.

Communication interface 404 may include one or more wireless interfaces and/or wireline interfaces that are configurable to communicate via a network, such as network 308 shown in FIG. 3. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 404 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 406 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 406 may be configured to execute computer-readable program instructions 310 that are contained in data storage 408, and/or other instructions, to carry out various functions described herein.

Data storage 408 may include one or more non-transitory computer-readable storage media that can be read or accessed by processor 406. The one or more computer-readable storage media may include volatile and/or non-volatile storage components, such as optical, magnetic, organic or other memory or disc storage, which can be integrated in whole or in part with processor 406. In some embodiments, data storage 408 may be implemented using a single physical device (e.g., one optical, magnetic, organic or other memory or disc storage unit), while in other embodiments, data storage 408 may be implemented using two or more physical devices.

Data storage 408 may also include program data 412 that can be used by processor 406 to carry out functions described herein. In some embodiments, data storage 408 may include, or have access to, additional data storage components or devices (e.g., cluster data storages described below).

Referring again briefly to FIG. 3, server device 310 and server data storage device 312 may store applications and application data at one or more locales accessible via network 308. These locales may be data centers containing numerous servers and storage devices. The exact physical location, connectivity, and configuration of server device 310 and server data storage device 312 may be unknown and/or unimportant to client devices. Accordingly, server device 310 and server data storage device 312 may be referred to as "cloud-based" devices that are housed at various remote locations. One possible advantage of such "cloud-based" computing is to offload processing and data storage from client devices, thereby simplifying the design and requirements of these client devices.

In some embodiments, server device 310 and server data storage device 312 may be a single computing device residing in a single data center. In other embodiments, server device 310 and server data storage device 312 may include multiple computing devices in a data center, or even multiple computing devices in multiple data centers, where the data centers are located in diverse geographic locations. For example, FIG. 3 depicts each of server device 310 and server data storage device 312 potentially residing in a different physical location.

Figure 4B:
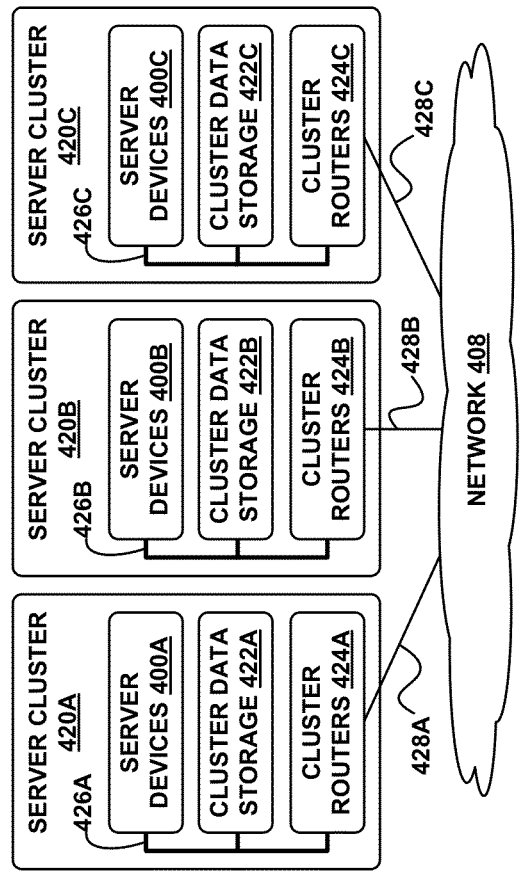
FIG. 4B depicts a cloud-based server system, in accordance with an example embodiment.

FIG. 4B depicts an example of a cloud-based server cluster. In FIG. 4B, functions of server device 310 and server data storage device 312 may be distributed among three server clusters 420A, 420B, and 420C. Server cluster 420A may include one or more server devices 400A, cluster data storage 422A, and cluster routers 424A connected by a local cluster network 426A. Similarly, server cluster 420B may include one or more server devices 400B, cluster data storage 422B, and cluster routers 424B connected by a local cluster network 426B. Likewise, server cluster 420C may include one or more server devices 400C, cluster data storage 422C, and cluster routers 424C connected by a local cluster network 426C. Server clusters 420A, 420B, and 420C may communicate with network 408 via communication links 428A, 428B, and 428C, respectively.

In some embodiments, each of the server clusters 420A, 420B, and 420C may have an equal number of server devices, an equal number of cluster data storages, and an equal number of cluster routers. In other embodiments, however, some or all of the server clusters 420A, 420B, and 420C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 420A, for example, server devices 400A can be configured to perform various computing tasks of a server, such as server device 310. In one embodiment, these computing tasks can be distributed among one or more of server devices 400A. Server devices 400B and 400C in server clusters 420B and 420C may be configured the same or similarly to server devices 400A in server cluster 420A. On the other hand, in some embodiments, server devices 400A, 400B, and 400C each may be configured to perform different functions. For example, server devices 400A may be configured to perform one or more functions of server device 310, and server devices 400B and server device 400C may be configured to perform functions of one or more other server devices. Similarly, the functions of server data storage device 312 can be dedicated to a single server cluster, or spread across multiple server clusters.

Cluster data storages 422A, 422B, and 422C of the server clusters 420A, 420B, and 420C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 310 and server data storage device 312 can be distributed across server clusters 420A, 420B, and 420C, various active portions and/or backup/redundant portions of these components can be distributed across cluster data storages 422A, 422B, and 422C. For example, some cluster data storages 422A, 422B, and 422C may be configured to store backup versions of data stored in other cluster data storages 422A, 422B, and 422C.

Cluster routers 424A, 424B, and 424C in server clusters 420A, 420B, and 420C, respectively, may include networking equipment configured to provide internal and external communications for the server clusters. For example, cluster routers 424A in server cluster 420A may include one or more packet-switching and/or routing devices configured to provide (i) network communications between server devices 400A and cluster data storage 422A via cluster network 426A, and/or (ii) network communications between the server cluster 420A and other devices via communication link 428A to network 408. Cluster routers 424B and 424C may include network equipment similar to cluster routers 424A, and cluster routers 424B and 424C may perform networking functions for server clusters 420B and 420C that cluster routers 424A perform for server cluster 420A.

Additionally, the configuration of cluster routers 424A, 424B, and 424C can be based at least in part on the data communication requirements of the server devices and cluster storage arrays, the data communications capabilities of the network equipment in the cluster routers 424A, 424B, and 424C, the latency and throughput of the local cluster networks 426A, 426B, 426C, the latency, throughput, and cost of the wide area network connections 428A, 428B, and 428C, and/or other factors that may contribute to the cost, speed, fault-tolerance, resiliency, efficiency and/or other design goals of the system architecture.

Figure 5:
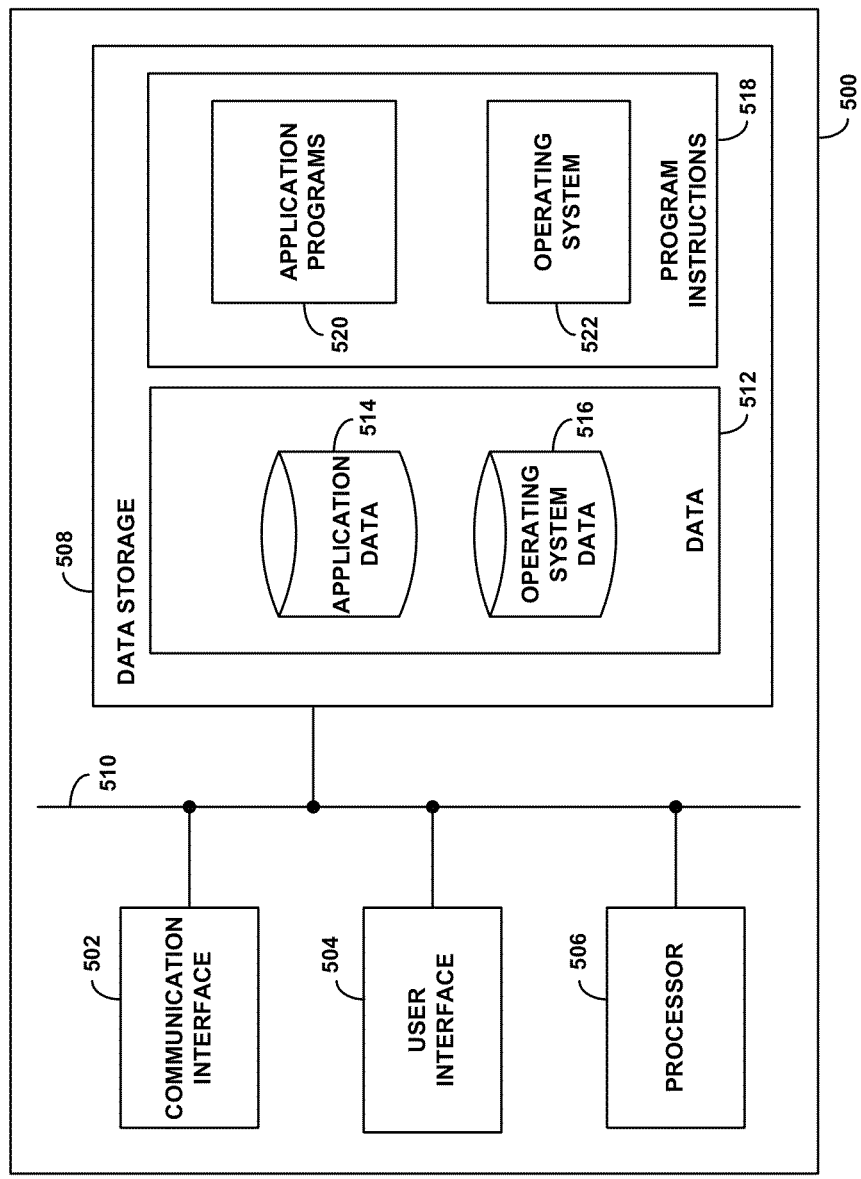
FIG. 5 depicts a block diagram of a client device, in accordance with an example embodiment.

FIG. 5 is a simplified block diagram showing some of the components of an example client device 500. By way of example and without limitation, client device 500 may be or include a "plain old telephone system" (POTS) telephone, a cellular mobile telephone, a still camera, a video camera, a fax machine, an answering machine, a computer (such as a desktop, notebook, or tablet computer), a personal digital assistant (PDA), a wearable computing device, a home automation component, a digital video recorder (DVR), a digital TV, a remote control, or some other type of device equipped with one or more wireless or wired communication interfaces.

As shown in FIG. 5, client device 500 may include a communication interface 502, a user interface 504, a processor 506, and data storage 508, all of which may be communicatively linked together by a system bus, network, or other connection mechanism 510.

Communication interface 502 functions to allow client device 500 to communicate, using analog or digital modulation, with other devices, access networks, and/or transport networks. Thus, communication interface 502 may facilitate circuit-switched and/or packet-switched communication, such as POTS communication and/or IP or other packetized communication. For instance, communication interface 502 may include a chipset and antenna arranged for wireless communication with a radio access network or an access point. Also, communication interface 502 may take the form of a wireline interface, such as an Ethernet, Token Ring, or USB port. Communication interface 502 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 502. Furthermore, communication interface 502 may comprise multiple physical communication interfaces (e.g., a Wifi interface, a BLUETOOTH® interface, and a wide-area wireless interface).

User interface 504 may function to allow client device 500 to interact with a human or non-human user, such as to receive input from a user and to provide output to the user. Thus, user interface 504 may include input components such as a keypad, keyboard, touch-sensitive or presence-sensitive panel, computer mouse, trackball, joystick, microphone, still camera and/or video camera. User interface 504 may also include one or more output components such as a display screen (which, for example, may be combined with a touch-sensitive panel), CRT, LCD, LED, a display using DLP technology, printer, light bulb, and/or other similar devices, now known or later developed. User interface 504 may also be configured to generate audible output(s), via a speaker, speaker jack, audio output port, audio output device, earphones, and/or other similar devices, now known or later developed. In some embodiments, user interface 504 may include software, circuitry, or another form of logic that can transmit data to and/or receive data from external user input/output devices. Additionally or alternatively, client device 500 may support remote access from another device, via communication interface 502 or via another physical interface (not shown).

Processor 506 may comprise one or more general purpose processors (e.g., microprocessors) and/or one or more special purpose processors (e.g., DSPs, GPUs, FPUs, network processors, or ASICs). Data storage 508 may include one or more volatile and/or non-volatile storage components, such as magnetic, optical, flash, or organic storage, and may be integrated in whole or in part with processor 506. Data storage 508 may include removable and/or non-removable components.

In general, processor 506 may be capable of executing program instructions 518 (e.g., compiled or non-compiled program logic and/or machine code) stored in data storage 508 to carry out the various functions described herein. Therefore, data storage 508 may include a non-transitory computer-readable medium, having stored thereon program instructions that, upon execution by client device 500, cause client device 500 to carry out any of the methods, processes, or functions disclosed in this specification and/or the accompanying drawings. The execution of program instructions 518 by processor 506 may result in processor 506 using data 512.

By way of example, program instructions 518 may include an operating system 522 (e.g., an operating system kernel, device driver(s), and/or other modules) and one or more application programs 520 (e.g., address book, email, web browsing, social networking, and/or gaming applications) installed on client device 400. Similarly, data 512 may include operating system data 516 and application data 514. Operating system data 516 may be accessible primarily to operating system 522, and application data 514 may be accessible primarily to one or more of application programs 520.

Application data 514 may be arranged in a file system that is visible to or hidden from a user of client device 500.

Application programs 520 may communicate with operating system 512 through one or more application programming interfaces (APIs). These APIs may facilitate, for instance, application programs 520 reading and/or writing application data 514, transmitting or receiving information via communication interface 502, receiving or displaying information on user interface 504, and so on.

In some vernaculars, application programs 520 may be referred to as "apps" for short. Additionally, application programs 520 may be downloadable to client device 500 through one or more online application stores or application markets. However, application programs can also be installed on client device 500 in other ways, such as via a web browser or through a physical interface (e.g., a USB port) on client device 500.

As described above, a swivel/360-degree spinner is an interactive, graphical user interface that functions to display a 3D object on a display device, while providing a capability to interactively rotate the 3D object through a variety of angular orientations. A swivel/360-degree spinner may be implemented in a computer device, such as desktop, laptop, smart phone, smart tablet, or other client device, and as such, may provide the interactive function to a user of the computer device. The client device 500, shown in FIG. 5 and discussed above, is an example of such a computer device. In a typical implementation, a swivel/360-degree spinner may be used in browser program, for example. An example application is display of products in online advertising, in which video-encoded assets may be received by the application in response to a request to view a product. Other applications are possible as well.

Video-encoded assets for a video-capable swivel/360-degree spinner may be generated by a computer device, such as server device 400 shown in FIG. 4. For generation of video-encoded assets, computer device need not necessarily be a server or even connected to a network. Once video-encoded assets are generated, they may be stored one or more data files (or other organized data formats) on a network-connected server, such as such as server device 400 or server cluster 420(A,B,C), also discussed above.

The discussion below considers only perspectives of a 3D object from exterior to the object. However, as noted above, for example in the discussions of FIGS. 1 and 2, example embodiments are not limited to exterior perspectives. Perspectives from inside a 3D object, for example looking outward, are possible as well. There is no loss in generality with respect to interior perspectives by directing the discussion to examples involving only exterior perspectives.

Figure 6:
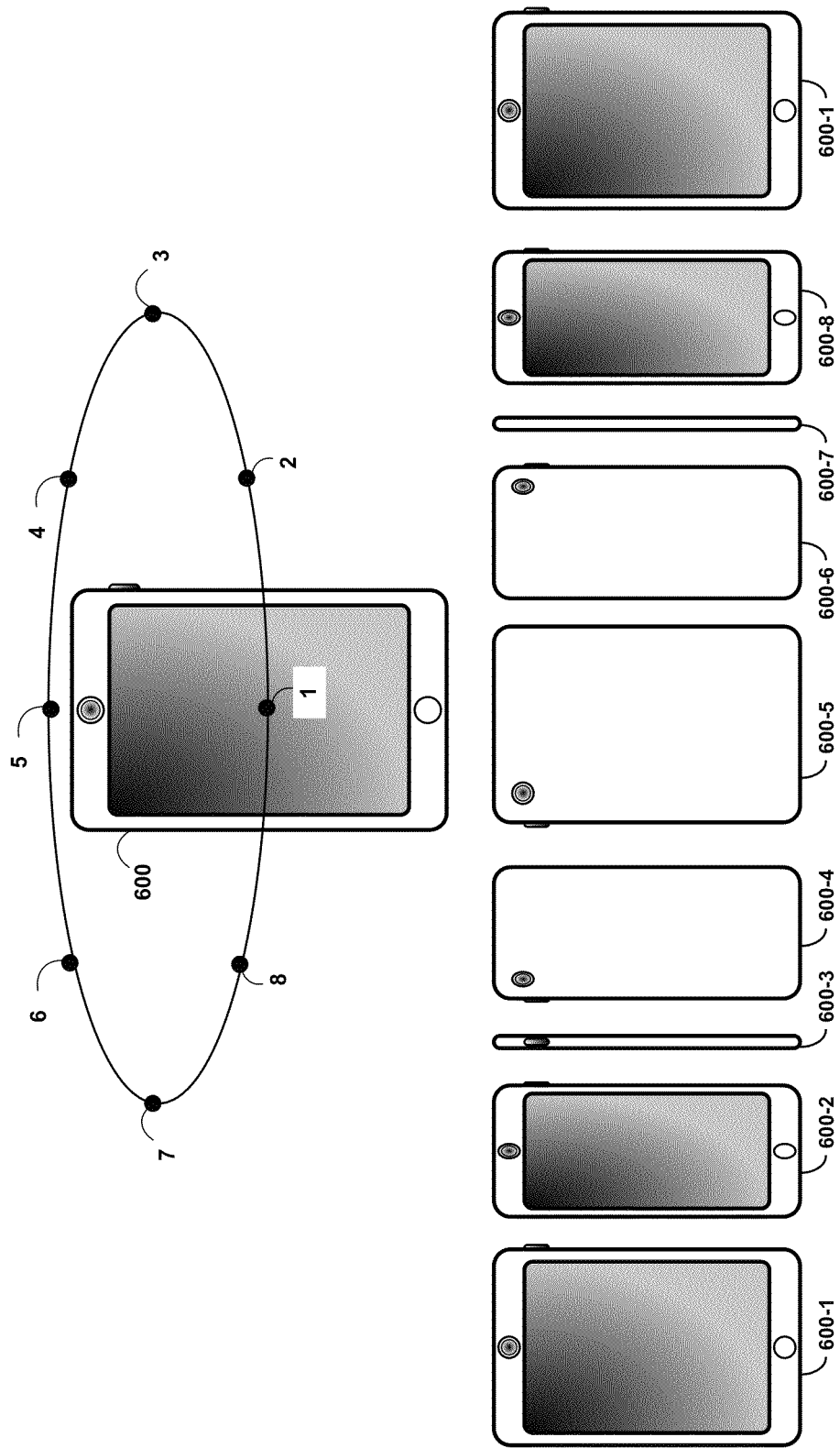
FIG. 6 illustrates view a 3D object from different perspectives along a planar path about the 3D object, in accordance with an example embodiment.

A conceptual illustration of producing views of an object from different perspectives is shown in FIG. 6, which depicts a 3D object 600 from different perspectives along a planar path about the 3D object, in accordance with an example embodiment. By way of example, the 3D object 600 is shown as viewed from eight different perspectives along an approximately circular orbit around the object 600. In the top portion of the figure the object 600 is shown face-on with eight perspective positions, numbered 1, . . . , 8, located at different points along a circular path. The term "orbit" is used to describe the path along which perspectives are located, but not necessarily to imply actual dynamic motion around the object 600. The bottom portion of the figure shows the object as viewed from each of the eight positions. The views are labeled 600-1, 600-2, . . . , 600-8, 600-1 (returning to the first view). In the views 600-2, 600-4, 600-6, and 600-8, the narrowing of the object 600 represents foreshortening without any 3D graphical effects.

Each of the views labeled 600-1, 600-2, . . . , 600-8, 600-1 can be considered as corresponding to a separate still image of the object 600. Each still image can be displayed on display device of a computer device (such as device 500) independently of any of the other images. That is, each still image is contains full image data for display.

Figure 7:
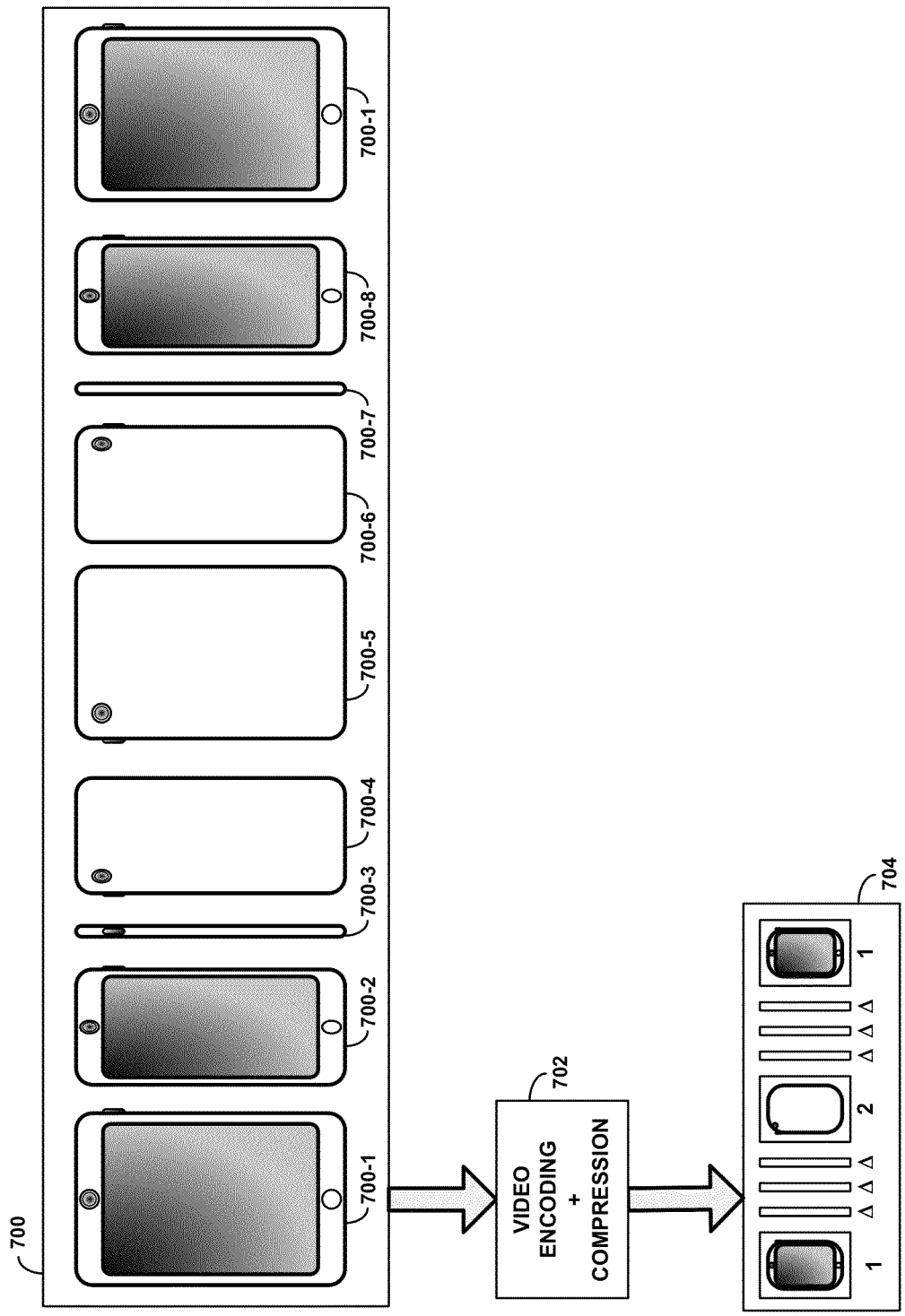
FIG. 7 is a conceptual illustration of video encoding and compression of a sequence of images of a 3D object from a multiplicity of perspectives, in accordance with an example embodiment.

FIG. 7 is a conceptual illustration of video encoding and compression of a sequence of images of a 3D object from a multiplicity of perspectives, in accordance with an example embodiment. A set of images 700 is shown in the top portion of the figure. The images, labeled 700-1, 700-2, . . . 700-8, 700-1, correspond to those shown in the bottom portion of FIG. 6, and each may be considered a separate, full image. The image set 700 could correspond to a conventional asset file, for example. As shown in FIG. 7, the set 700 is input to a video encoding+compression module 702, which generates a video file 704 containing video frames. By way of example, the video encoding+compression module 702 could operate according to a video protocol such as h.264, webm, or avi, although the scope of the example embodiments is not necessarily limited to these protocols. For purpose of conceptual illustrations, the frames show two different full frame views, labeled 1 and 2, and six difference frames, each labeled "A." The video file 704 is shown as being smaller than the initial asset file 700. This represents the actual smaller data size of the compressed video file in comparison with the original asset file.

As is generally known, video encoding takes advantage of a substantial similarity of image content in adjacent frames to enable coding of just the differences between successive video frames rather than complete image content. This approach works, in particular, for continuous movement and/or scene content from one frame to the next. Intersperse with the difference frames are full image frames. These may be used, for example, when a scene changes discontinuously, or as periodic or occasional reference-setting frames. In the terminology of video encoding, the full (or largely) full image frames are referred to as "intra-coded" frames, or "I-frames." Two types of difference frames are used, referred to as "predictive" frames, or "P-frames, and "bi-directional" frames, or "B-frames." In the context of video playback, each frame may include a time stamp to specify temporal order in a sequence of frames. Each I-frame may be a substantially full digital image representing a moment in the video. P-frames and B-frames (bi-directional frames), on the other hand, may define mere changes in relation to one or more other frames, such as vector displacements from an I-frame and/or other frames. A video display device may present each I-frame at its time-stamped moment and may then render changes to the presented image in accordance with P-frames and/or B-frames between successive I-frames. The result may appear as smooth motion on the display device.

In the context of a video-encoding of assets for a swivel/360-degree spinner, each frame may include a label or tag that specifies a perspective with respect to a 3D object. As described below, the specified perspective may be used by the swivel/360-degree spinner to correlated frames with an orientation or angle input by an interactive cursor, for example, moving on one or another trajectory on the display device. Thus the video encoding+compression module 702 may include perspective information in the generation of the video asset file 704. By way of illustration, the video frames labeled 1 and 2 in the video asset file 704 could correspond to I-frames, while the frames labeled Δ could correspond to P-frames or B-frames.

Figure 8:
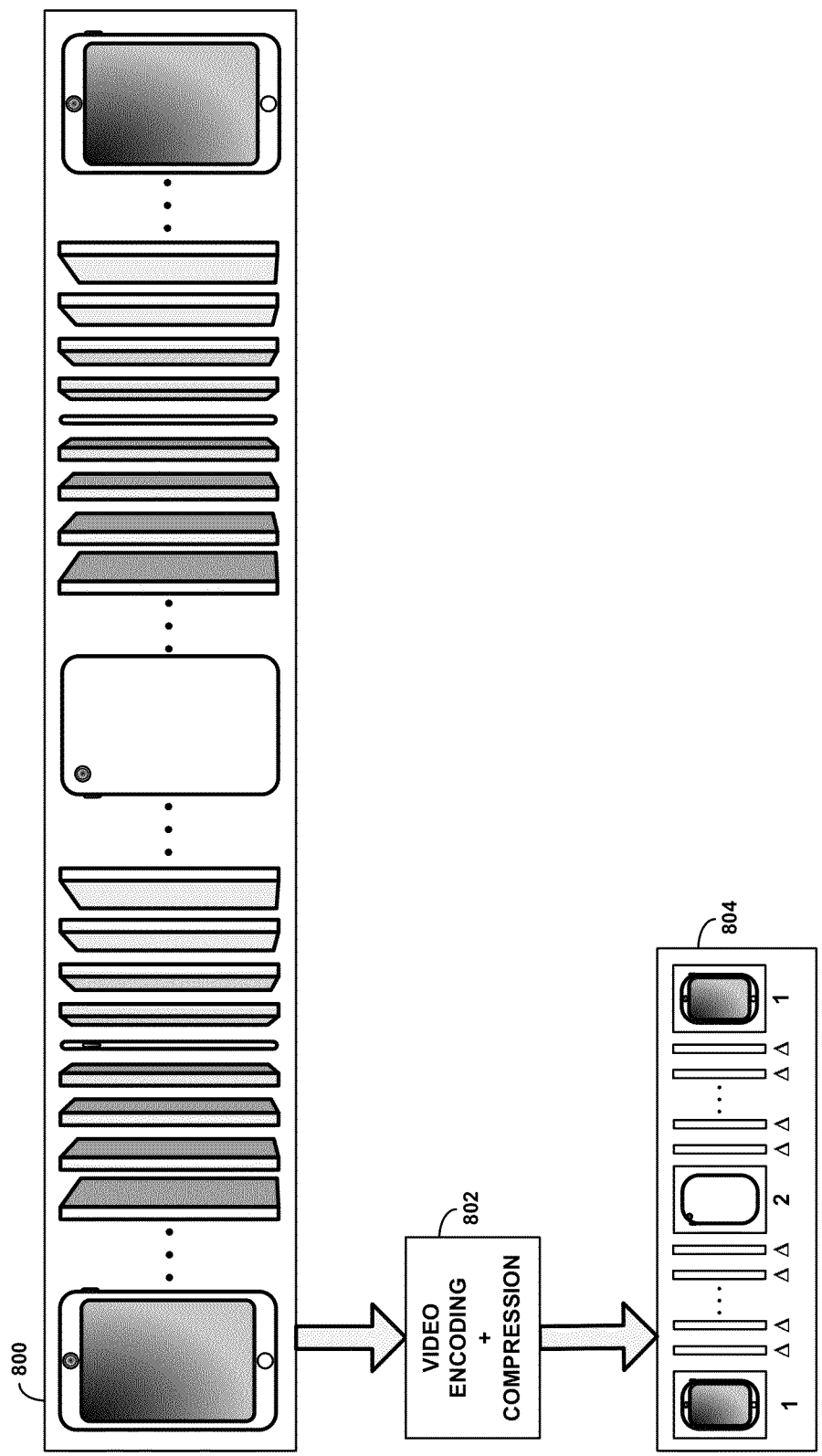
FIG. 8 is a further conceptual illustration of video encoding and compression of a sequence of images of a 3D object from a multiplicity of perspectives, in accordance with an example embodiment.

FIG. 8 is a further conceptual illustration of video encoding and compression of a sequence of images of a 3D object from a multiplicity of perspectives, in accordance with an example embodiment. This illustration is similar to that of FIG. 7, but several more perspectives around the 3D object are represented. For illustrative purposes, the perspectives at locations between the front and back views of the 3D object are rendered in 3D. The asset file 800 is input to a video encoding+ compression module 802, which generates a video file 804 containing video frames. Again, the frames show two different full frame views, labeled 1 and 2, which could be I-frames, and six difference frames, each labeled Δ, which could be P-frames or B-frames. Once more, the video file 804 is shown as being smaller than the initial asset file 800. The video file may also include perspective information, such as angular orientation with respect to the 3D object, associated with each video frame.

Figure 9:
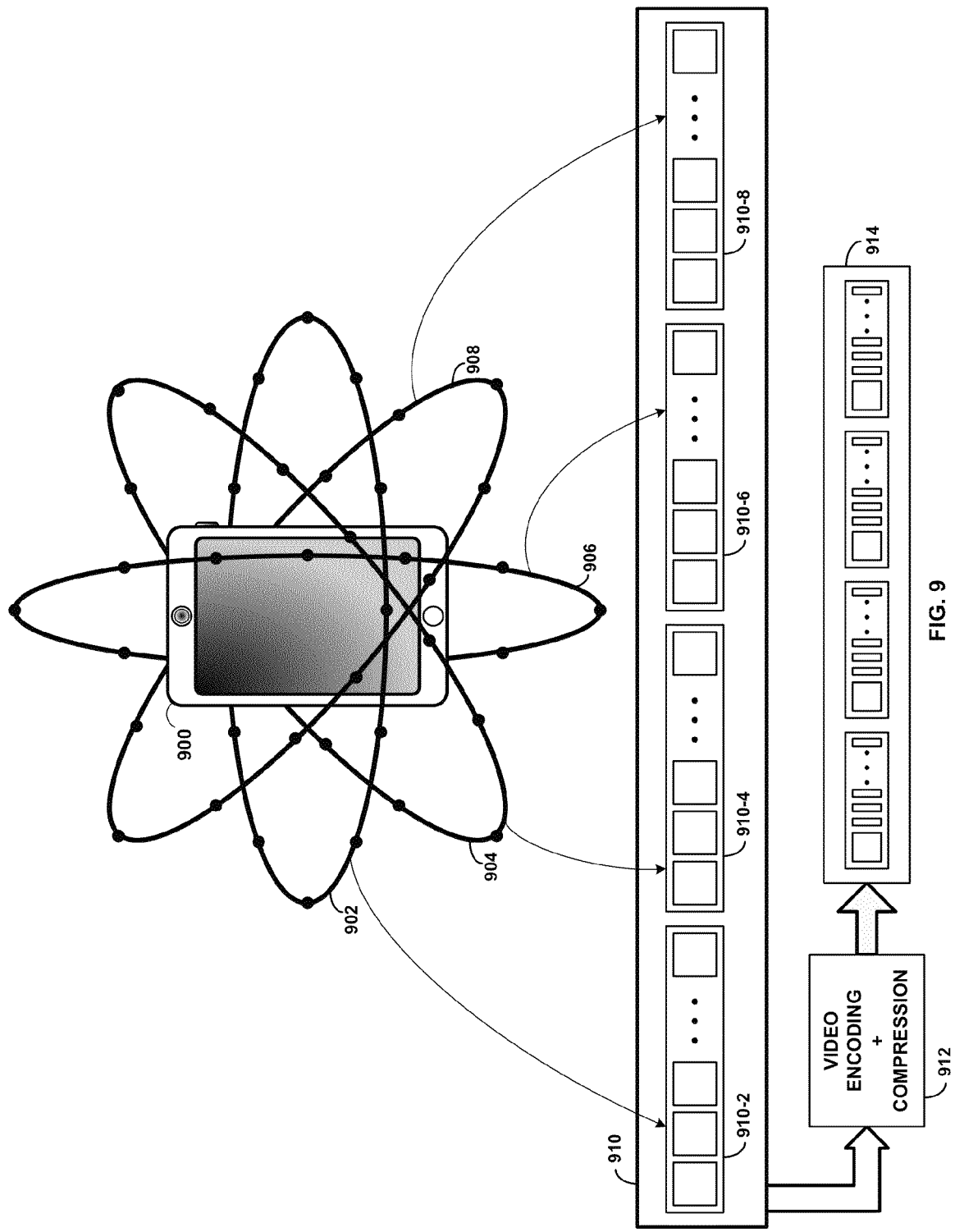
FIG. 9 is a conceptual illustration of video encoding and compression of a sequence of images of a 3D object from a multiplicity of perspectives along curves in different planes that pass through the 3D object, in accordance with an example embodiment.

FIG. 9 is a conceptual illustration of video encoding and compression of a sequence of images of a 3D object from a multiplicity of perspectives along curves in different planes that pass through the 3D object, in accordance with an example embodiment. By way of example, apparently circular orbits on four different planes are shown. Each of the four planes passes through the object 900 at a different angle. Images from different points along each orbit are concatenated or "stacked" in sub-segments or "strips" of an asset file 910. Images from along orbit 902 are stacked in strip 910-2; images from along orbit 904 are stacked in strip 910-4; images from along orbit 906 are stacked in strip 910-6; and images from along orbit 908 are stacked in strip 910-8.

The asset file 910 is then input to a video encoding+compression module 912, which generates a video file 914 containing video frames. The video frames are organized in four sub-segments, one each corresponding to one of the sub-segments of the asset file 910. It will be appreciate that the number and orientations of the orbits shown in FIG. 9 are only examples, and that other arrangements are possible as well.

The different perspectives shown as being located along one or another of the orbits 902, 904, 906, and 906 do not necessarily have to be acquired or generated strictly in order along those orbits or in a temporal order corresponding to their spatial order. For example, a multiplicity of perspectives could be distributed uniformly (or approximately so) on a sphere centered approximately on the 3D object 900. Subsequently, sub-sequences of perspectives from the multiplicity could be identified according to their location on or within a threshold distance of a particular orbit. A sequence of images corresponding to each such sub-sequence identified could then be one of a plurality of strips, such as strips 910-2, 910-4, 910-6, or 910-8 that are collectively video encoded, as in the illustration of FIG. 9.

In further accordance with example embodiments, sub-sequences perspectives need not necessarily be arranged in curves in a plane. For example, sub-sequences could correspond to clusters of perspectives on the sphere of perspectives described above. Using such an arrangement, sub-sequences of images from different perspectives could be constructed as patches of clustered images covering (or partially covering) the sphere. The ordering of perspectives in a cluster could be one or another pattern thought the points of the cluster. Example patterns could include a spiral, a zig-zag, and an orderd lattice, among other possibilities. Each sub-sequence of images could then be included in the image asset file, and encoded into corresponding sub-sequences of video frame.

Further still, sub-sequences of images could be arranged both along planar curves and in clusters, and the encoded video file could thus contain corresponding video frames. As in the previous examples, the video file may also include perspective information, such as angular orientation with respect to the 3D object, associated with each video frame.

Figure 10:
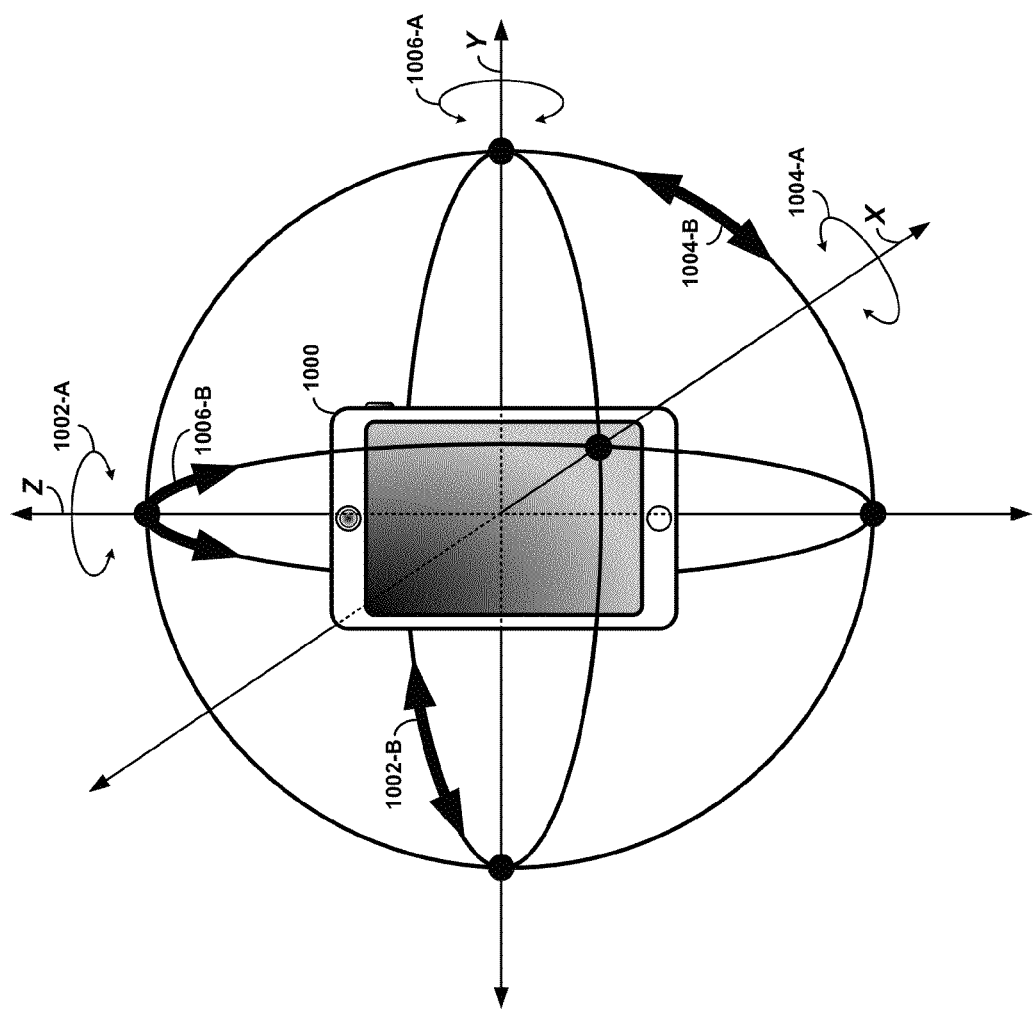
FIG. 10 illustrates the geometry of different orbital planes about a 3D object, in accordance with an example embodiment.

There are various ways to characterize perspective positions around an object. The concept of an orbit around the object can be parameterized in terms of an orbital plane, and an angular rotation about the object. FIG. 10 illustrates the geometry of different orbital planes about a 3D object 1000, in accordance with an example embodiment. In the figure, angular motion 1002-A around a z-axis corresponds to an orbit in the xy-plane with motion 1002-B. Similarly, angular motion 1004-A around an x-axis corresponds to an orbit in the yz-plane with motion 1004-B; and angular motion 1006-A around a y-axis corresponds to an orbit in the xz-plane with motion 1006-B.

It should be understood that the term "motion" as used in relation to the various perspectives of an object is not intended to convey that an image capture device, such as a digital camera, is in actual motion around the object. Rather, the rendering to perspective images into video form yields video frames that when processed and displayed on a video display give the appearance of the object rotating about one of the axes, as if the image capture device was moving along one or more of the orbits when the images were captured or generated. In the context of a swivel/360-degree spinner, the apparent motion is controlled by an interactive cursor dragging the object through the various perspectives represented in the video frames (or interpolated between video frames).

The video-compressed asset file or files can be stored on a server in a network, and accessed by a client device for video display processing at a later time.

Figure 11:
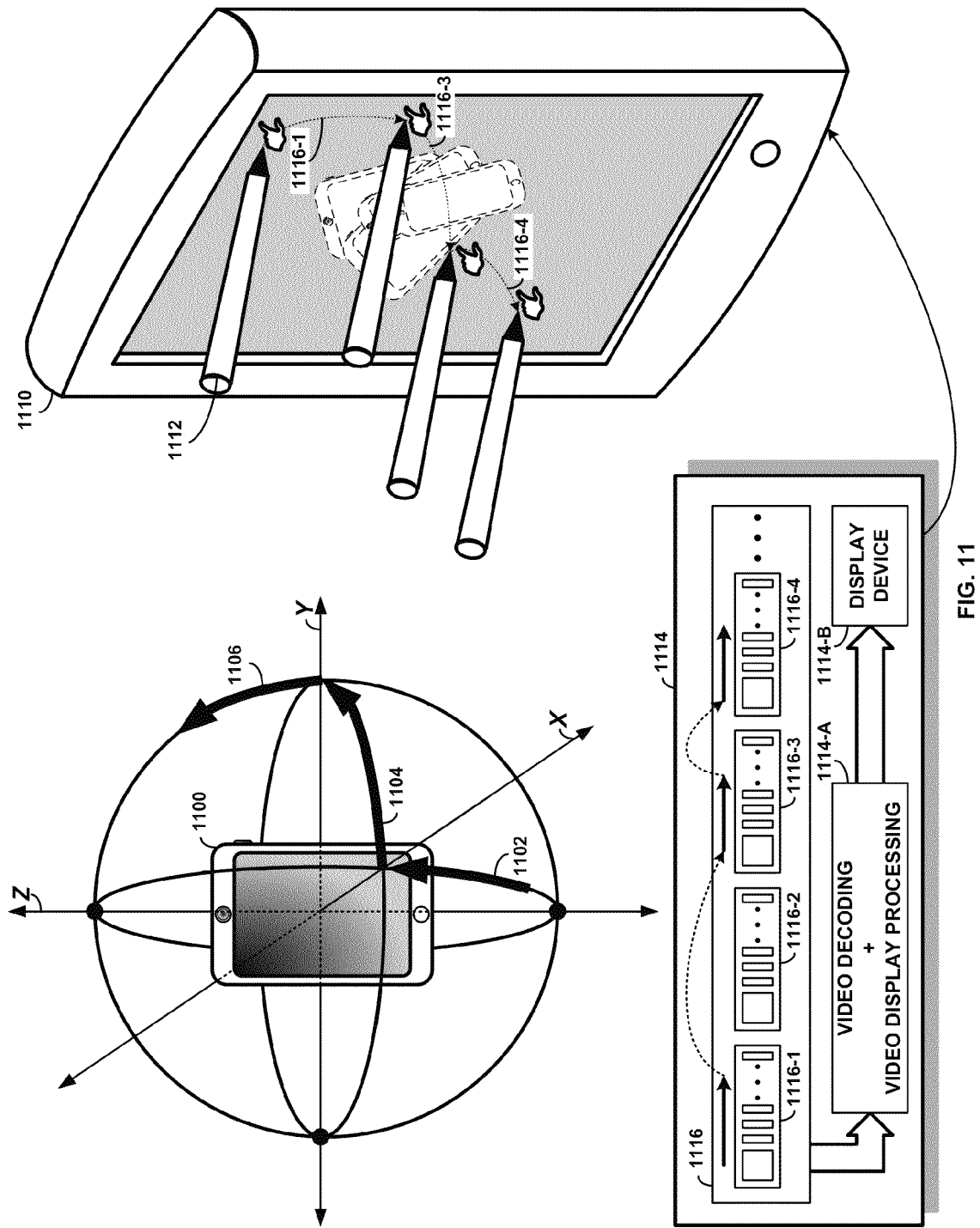
FIG. 11 illustrates interactive rotation of an image of a 3D object in a display, in accordance with an example embodiment.

FIG. 11 illustrates interactive rotation of an image of a 3D object in a display, in accordance with an example embodiment. A client device, represented by way of example as a tablet 1110, has a swivel/360-degree spinner component 1114. The component 1114, which could include hardware, software, and firmware elements, includes a video decoding+ video display processing module 1114-A, and a display device 1114-B. In particular, the video processing and display capabilities of the swivel/360-degree spinner may be base, at least in part, on native capabilities of the tablet 1110 and/or of a browser or other program of the tablet 1110. A video-encoded asset file 1116 is depicted as loaded into the swivel/360-degree spinner. For example, the file 1116 could have been downloaded from a server or other remote device (not shown in the figure). An interactive cursor 1112 dragging a 3D object through various angular orientations represented by way of example by a stylus.

The upper left portion of the figure recreates the orbits and orbital planes of FIG. 10. However, in FIG. 11, the orbits and orbital planes around an object 1100 represent perspectives interactively selected by a swivel/360-degree spinner as the stylus 1112 moves in a trajectory across the display plane of the tablet 1110. By way of example, as the stylus moves across the display plane in different trajectories, the orientations in the orbits move along arc 1102 in the xz-plane, to the arc 1104 in the xy-plane, to the arc 1106 in the yz-plane. For purposes of illustration, these path segments are shown as being video encoded in sub-segments 1116-1, 1116-3, and 1116-4 of the video asset file 1116. Also for purposes of illustration, the sub-segment 1116-2 evidently contains no video frames corresponding to the three arcs, and so it is skipped in processing by the swivel/360-degree spinner.

By way of example, the stylus is shown as traversing three trajectories in the display plane of the tablet 1110; they are labeled in correspondence with video asset sub-segments processed by the swivel/360-degree spinner. A rendering of 3D object 1100 shown in the display of the tablet 1110 is shown in different orientations, meant to represent smooth angular motion as the swivel/360-degree spinner rotates it in correspondence with motion of the stylus 1112.

In accordance with example embodiments, as the stylus moves across one or the other of the trajectories, the swivel/360-degree spinner maps the trajectory to an angular orientation about the 3D object 1100. The mapped angular orientation may then be used to identify which video frames to process and display. In the example, motion along the trajectory 1116-1 is mapped to the sequence of video frames with the same label, 1116-1. These video frames could correspond to the arc 1102, for example, in the upper left portion of FIG. 11. Also by way of example, motion along the trajectory 1116-3 is mapped to the sequence of video frames with the same label, 1116-3. These video frames could correspond to the arc 1104. The video frames of the sequence 1116-2 could correspond to an extension of the arc 1102 in the xz-plane above x=0. However, in this illustration, the trajectory 1116-3 corresponds to rotation in the xy-plane, along the arc 1104. Consequently, the sequence 1116-2 is skipped over by the swivel/360-degree spinner in this illustrative example. Finally, motion along the trajectory 1116-4 is mapped to the sequence of video frames with the same label, 1116-4, corresponding to the 1106.

It will be appreciated that the illustration shown in FIG. 11 is just one example of operation of a video-enabled swivel/360-degree spinner, and is not intended to limit the scope of example embodiments.

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

What is claimed is:

1. A method comprising:
   responsive to a request transmitted from a computer device to one or more server devices communicatively connected to the computer device, receiving by the computer device a video file, wherein the video file comprises video frames of compressed video-format data generated from a sequence of still images of a three-dimensional (3D) object as viewed from each of a multiplicity of perspectives along one or more spatial trajectories about the 3D object, the multiplicity of perspectives corresponding at least to different 3D angular orientations about the 3D object;
   displaying by the computer device an image of the 3D object in a display window on a display device of the computer device; and
   responsive to an interactive cursor of a user interface of the computer device moving on one or more trajectories in the display window while the interactive cursor is virtually attached to the image of the 3D object, video processing by the computer device one or more subsets of the video frames, each subset corresponding to a respective one of the multiplicity of perspectives along the one or more spatial trajectories about the 3D object, in order to cause animated 3D angular movement of the image of the 3D object to be displayed in the display window, the animated 3D angular movement corresponding to angular movement of the 3D object about at least one axis that passes through the 3D object.

2. The method of claim 1, wherein the interactive cursor moving on one or more trajectories in the display window while the interactive cursor is virtually attached to the image of the 3D object comprises:
   the interactive cursor virtually grabbing the image of the 3D object; and
   thereafter, the interactive cursor moving on the one or more trajectories in the display window.

3. The method of claim 1, wherein the multiplicity of perspectives corresponding at least to different 3D angular orientations about the 3D object comprise perspectives from different positions along a respective curved path exterior to the 3D object and in at least one plane perpendicular to an axis that passes through the 3D object.

4. The method of claim 3, wherein the different positions along the respective curved path exterior to the 3D object and in the at least one plane perpendicular to an axis that passes through the 3D object comprise different positions along a respective curved path in each of at least two different planes perpendicular to a common axis that passes through the 3D object.

5. The method of claim 3, wherein the different positions along the respective curved path exterior to the 3D object and in the at least one plane perpendicular to an axis that passes through the 3D object comprise different positions along a respective curved path in each of at least two different planes, each perpendicular to a different axis that passes through the 3D object.

6. The method of claim 1, wherein video processing by the computer device the one or more subsets of the video frames comprises displaying video motion of the image of the 3D object rotating around the at least one axis, as viewed from a particular perspective.

7. The method of claim 6, wherein the at least one axis comprises two or more different axes that each pass through the 3D object,
   wherein moving on the one or more trajectories in the display window comprises switching between at least two of the two or more axes,
   and wherein displaying video motion of the image of the 3D object rotating around the at least one axis, as viewed from a particular perspective comprises displaying respective segments of video motion of the image of the 3D object rotating around each of the at least two of the two or more axes in correspondence to switching between at least two of the two or more axes.

8. The method of claim 6, wherein the one or more spatial trajectories about the 3D object comprise a clockwise trajectory and a counterclockwise trajectory corresponding to a reverse of the clockwise trajectory,
   and wherein displaying video motion of the image of the 3D object rotating around the at least one axis, as viewed from a particular perspective comprises:
   displaying rotational motion of the image of the 3D object in a clockwise rotational direction around the at least one axis in response to motion on the clockwise trajectory; and
   displaying rotational motion of the image of the 3D object in a counterclockwise rotational direction around the at least one axis in response to motion on the counterclockwise trajectory.

9. The method of claim 3, wherein video processing by the computer device the one or more subsets of the video frames comprises:

interpolating video data from one or more subsets of video frames to generate interpolated video data corresponding to interpolated perspectives from different positions along a respective curved path in at least one interpolated plane perpendicular to an interpolated axis that passes through the 3D object; and displaying video motion of the image of the 3D object rotating around the at least one interpolated axis, as viewed from a particular perspective.

10. The method of claim 6, wherein displaying video motion of the image of the 3D object rotating around the at least one axis, as viewed from the particular perspective comprises displaying the video motion in a browser program of the computer device, and wherein the browser program comprises a video application programming interface (API).

11. The method of claim 10, wherein the video API is HTML5.

12. A system comprising:
one or more processors, including one or more video processors;
memory; and
machine-readable instructions stored in the memory, that upon execution by the one or more processors cause the system to carry out operations comprising:
receiving a video file comprising video frames of compressed video-format data generated from a sequence of still images of a three-dimensional (3D) object as viewed from each of a multiplicity of perspectives along one or more spatial trajectories about the 3D object, the multiplicity of perspectives corresponding at least to different 3D angular orientations about the 3D object,
displaying an image of the 3D object in a display window on the display device, and
responsive to an interactive cursor of a user interface of the computer device moving on one or more trajectories in the display window while virtually the interactive cursor is attached to the image of the 3D object, video processing with the one or more video processors one or more subsets of the video frames, each subset corresponding to a respective one of the multiplicity of perspectives along the one or more spatial trajectories about the 3D object, in order to cause on the display device animated 3D angular movement of the image of the 3D object about at least one axis that passes through the 3D object.

13. A non-transitory computer-readable storage medium, having stored thereon program instructions that, upon execution by one or more processors of a system, cause the system to perform operations comprising:
responsive to a request transmitted from the system to one or more server devices communicatively connected to the system, receiving by the system a video file, wherein the video file comprises video frames of compressed video-format data generated from a sequence of still images of a three-dimensional (3D) object as viewed from each of a multiplicity of perspectives along one or more spatial trajectories about the 3D object, the multiplicity of perspectives corresponding at least to different 3D angular orientations about the 3D object;
displaying an image of the 3D object in a display window on a display device of the system; and
responsive to an interactive cursor of a user interface of the computer device moving on one or more trajectories in the display window while the interactive cursor is virtually attached to the image of the 3D object, video processing by the system one or more subsets of the video frames, each subset corresponding to a respective one of the multiplicity of perspectives along the one or more spatial trajectories about the 3D object, in order to cause animated 3D angular movement of the image of the 3D object to be displayed in the display window, the animated 3D angular movement corresponding to angular movement of the 3D object about at least one axis that passes through the 3D object.

14. The system of claim 12, wherein the multiplicity of perspectives corresponding at least to different 3D angular orientations about the 3D object comprise perspectives from different positions along a respective curved path exterior to the 3D object and in at least one plane perpendicular to an axis that passes through the 3D object,
and wherein the interactive cursor moving on one or more trajectories in the display window while the interactive cursor is virtually attached to the image of the 3D object comprises:
the interactive cursor virtually grabbing the image of the 3D object; and
thereafter, the interactive cursor moving on the one or more trajectories in the display window.

15. The system of claim 14, wherein the different positions along the respective curved path exterior to the 3D object and in the at least one plane perpendicular to an axis that passes through the 3D object comprise different positions along a respective curved path in each of at least two different planes,
and wherein the at least two different planes are one of: perpendicular to a common axis that passes through the 3D object, or each perpendicular to a different axis that passes through the 3D object.

16. The system of claim 12, wherein video processing by the computer device the one or more subsets of the video frames comprises displaying video motion of the image of the 3D object rotating around the at least one axis, as viewed from a particular perspective.

17. The system of claim 15, wherein video processing by the computer device the one or more subsets of the video frames comprises:
interpolating video data from the one or more subsets of video frames to generate interpolated video data corresponding to interpolated perspectives from different positions along a respective curved path in at least one interpolated plane perpendicular to an interpolated axis that passes through the 3D object; and
displaying video motion of the image of the 3D object rotating around the at least one interpolated axis, as viewed from a particular perspective.

18. The non-transitory computer-readable storage medium of claim 13, wherein the multiplicity of perspectives corresponding at least to different 3D angular orientations about the 3D object comprise perspectives from different positions along a respective curved path exterior to the 3D object and in at least one plane perpendicular to an axis that passes through the 3D object,
and wherein the interactive cursor moving on one or more trajectories in the display window while the interactive cursor is virtually attached to the image of the 3D object comprises:
the interactive cursor virtually grabbing the image of the 3D object; and
thereafter, the interactive cursor moving on the one or more trajectories in the display window.

19. The non-transitory computer-readable storage medium of claim 13, wherein video processing by the computer device the one or more subsets of the video frames comprises displaying video motion of the image of the 3D object rotating around the at least one axis, as viewed from a particular perspective.

20. The non-transitory computer-readable storage medium of claim 19, wherein the at least one axis comprises two or more different axes that each pass through the 3D object,
   wherein moving on the one or more trajectories in the display window comprises switching between at least two of the two or more axes,
   and wherein displaying video motion of the image of the 3D object rotating around the at least one axis, as viewed from a particular perspective comprises displaying respective segments of video motion of the image of the 3D object rotating around each of the at least two of the two or more axes in correspondence to switching between at least two of the two or more axes.

* * * * *